Feb. 6, 1945.  J. E. NIELSEN  2,369,070
SIGNAL FOR ELECTRIC BRIDGE MEASUREMENTS
Filed Dec. 14, 1943   3 Sheets-Sheet 2
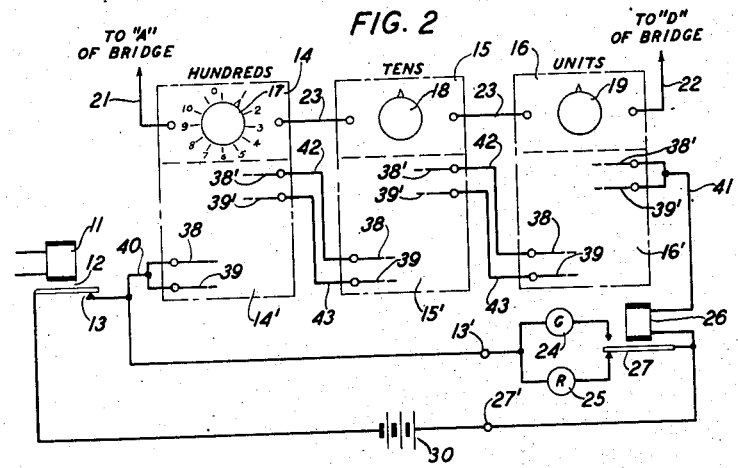
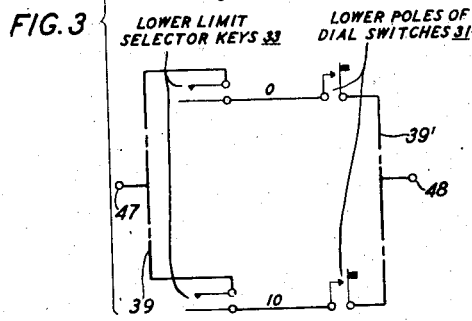
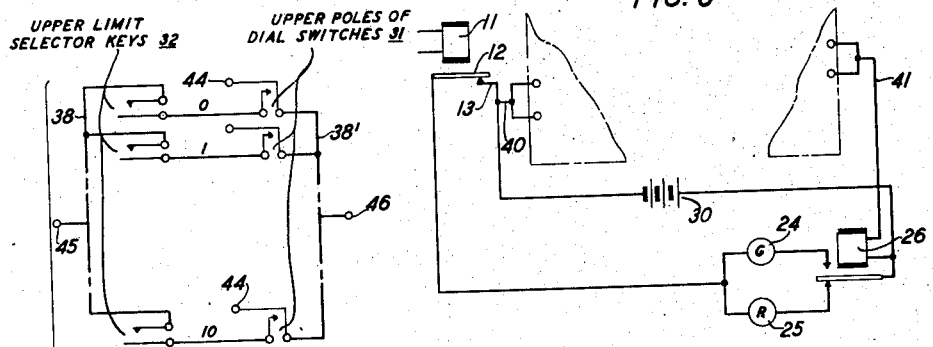
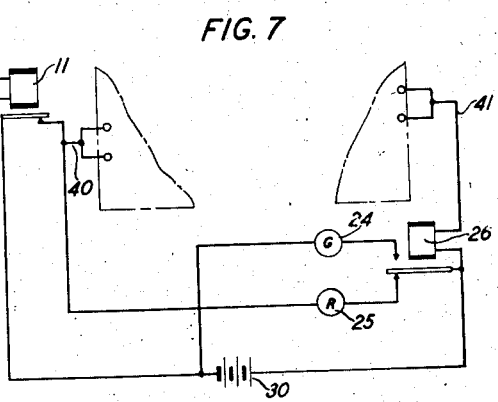
INVENTOR
J. E. NIELSEN
BY Walter M. Hill
ATTORNEY Feb. 6, 1945.  J. E. NIELSEN  2,369,070

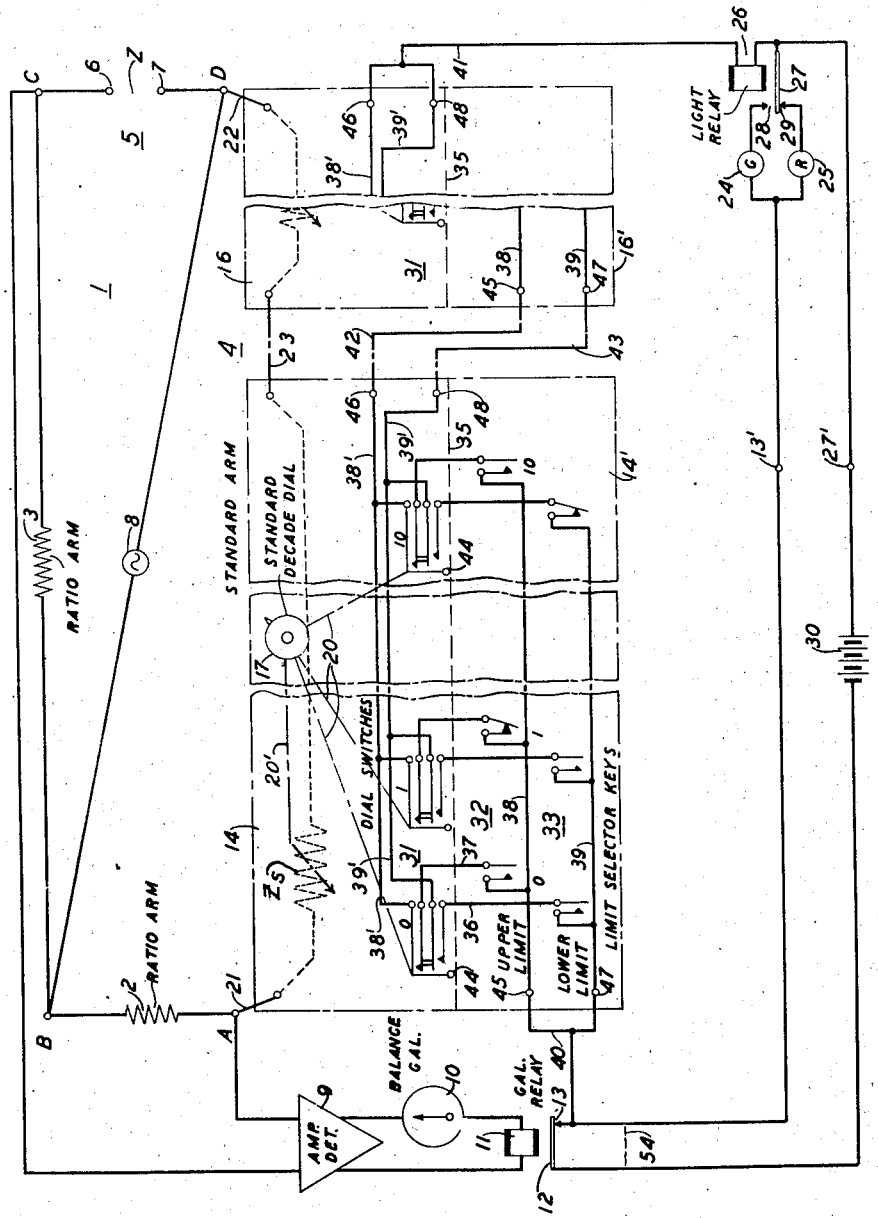

SIGNAL FOR ELECTRIC BRIDGE MEASUREMENTS

Filed Dec. 14, 1943  3 Sheets-Sheet 3

INVENTOR
J. E. NIELSEN
BY
Walter M. Hill
ATTORNEY

Patented Feb. 6, 1945

2,369,070

UNITED STATES PATENT OFFICE 2,369,070

SIGNAL FOR ELECTRIC BRIDGE MEASUREMENTS

John E. Nielsen, West Orange, N. J., assignor to Bell Telephone Laboratories, Incorporated, New York, N. Y., a corporation of New York Application December 14, 1943, Serial No. 514,287

12 Claims. (Cl. 177—311)

This invention relates to electric bridge impedance standards and more particularly to a balance and limit signal means therefor.

In the practical use of electric bridges and especially in the use of alternating current bridges where more than one component is to be adjusted, considerable effort and time is expended in reading the various dials of the bridge standard to determine whether or not a particular piece of electrical apparatus under test is inside or outside predetermined specified limits.

It is of particular advantage when measuring large quantities of the same kind of electrical device to merely observe a signaling means indicating whether or not the device under test is inside or outside the required limits. This wholly obviates the necessity of reading the actual values of the various dials of the standard as such readings need only be taken when the actual impedance component values need be known.

It is therefore the object of this invention to provide a signaling means adapted to signal the operator that the measuring bridge is balanced and that the device under test is either inside or outside the prescribed limits.

The foregoing object is attained by this invention by providing in combination a plurality of switches for each dial of the bridge standard, a separate one of said switches being adapted to operate at each of the separate dial positions, a pair of preselector keys for each of these dial switches, a relay, circuits connecting the preselector keys and the dial switches in series with the relay whereby the relay is caused to operate whenever a circuit is completed through the preselector keys and the dial switches, two signaling means associated with the relay, one of said signaling means being adapted to indicate the operation of the relay and the other signaling means being adapted to indicate the release of the relay, a second relay responsive to the unbalance voltage of an electric bridge in which the standard may be used, and contacts for said second relay in circuit with said two signaling means adapted to permit said signaling means to operate only when the bridge balance voltage is substantially equal to zero.

The invention may be better understood by referring to the accompanying drawings in which:

Fig. 1 shows a preferred form of the invention embodied in a bridge standard used in conjunction with a familiar type of comparison bridge;

Fig. 2 shows in block form how the invention may be applied to an impedance component standard having three series-connected decades;

Fig. 3 shows in greater detail how the upper and lower preselector keys are connected with their respective dial switches;

Figs. 6 and 7 show alternative but equivalent means for connecting the bridge balance and signal means with the preselector and dial switches.

Figure 4:
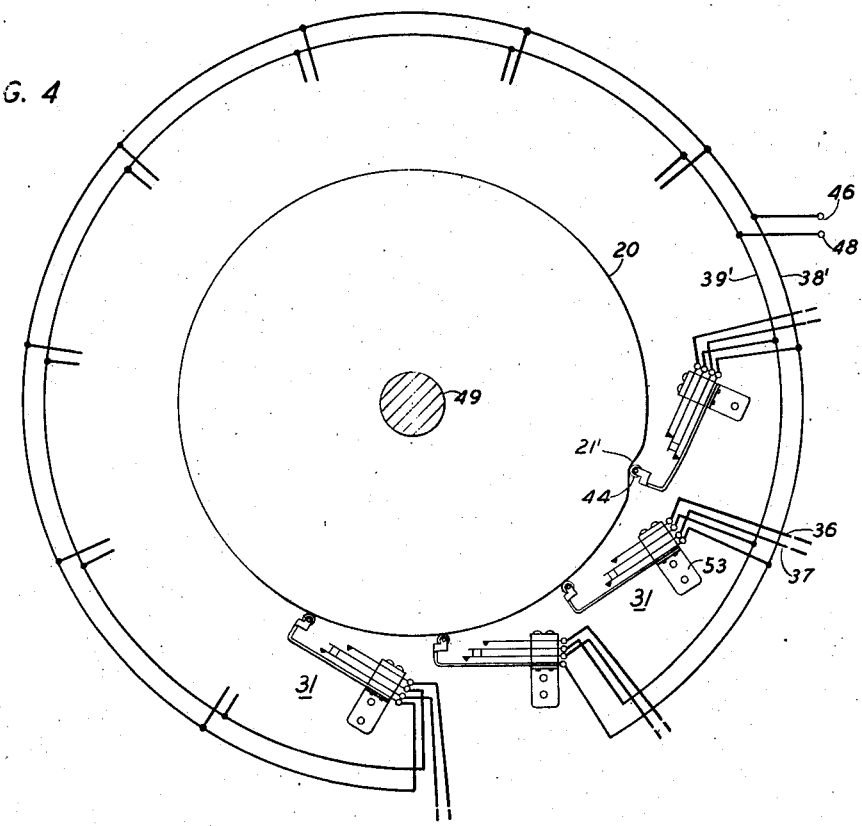
Fig. 4 shows the mechanical arrangement of the dial switches for one dial.

Referring now more particularly to Fig. 1 wherein is disclosed a familiar type of comparison bridge generally denoted by the reference numeral 1. This bridge has the conventional four arms with terminals denoted A, B, C and D, respectively. Ratio arms 2 and 3 are connected between the A—B terminals and the B—C terminals, respectively. The standard arm 4 contains the standard impedance elements as for example the impedance element Zs shown in standard decade unit 14 while the unknown arm 5 connected between the C and D terminals contains test terminals 6 and 7 to which may be connected an unknown impedance Z. The input to this bridge is an alternating current source 8 which is connected to the B and D terminals of the bridge. The output of the bridge is derived from the A and C terminals and may be amplified by a suitable amplifier-detector 9, the rectified output of which is connected to a suitable balance galvanometer 10 and galvanometer relay 11 serially connected to the output of amplifier-detector 9.

The use of the bridge is entirely conventional and requires no detailed explanation. It should be remembered that as in all such bridges when the bridge approaches balance the output voltage derived from the A—C terminals approaches zero. As this voltage approaches zero the rectified output from amplifier-detector 9 also approaches zero and, consequently, the series-connected balance galvanometer 10 and galvanometer relay 11 return to their normal unenergized positions whereupon armature 12 is released and permitted to close the circuit between armature 12 and contact 13. It will thus be seen that so long as the bridge is unbalanced armature 12 will be drawn away from contact 13 to keep this circuit open. The purpose of this circuit which is part of the preferred embodiment will be described later.

In the standard or measuring arm 4 of the bridge will be found the standard decade units 14 and 16 each containing a standard impedance or admittance element, as for example, impedance element Zs in decade unit 14. This impedance element is adjustable and is under control of the standard decade dial 17 through a mechanical linkage schematically illustrated as 20'. As many of these decade units as is necessary may be connected between terminals A and D. Each of these decade units is adjusted in magnitude by a suitable dial as dial 17 for the decade 14 shown in Fig. 1. The various impedance elements for these standard decades are not shown in detail as they are entirely conventional and are connected to the A and D corners by means of connectors 21 and 22, the connections between the decades themselves being completed by means of connectors 23 as shown schematically by the circuit through the standard impedance element Zs in Fig. 1.

In accordance with a preferred embodiment of this invention it is desired to have a pair of indicators 24 and 25 indicate both the fact that the bridge is balanced and whether or not the device under test is within the prescribed limits. For example, signaling device 24 may preferably be a green incandescent lamp, while signaling device 25 may preferably be a red incandescent lamp. In the preferred form this invention contemplates having the green lamp 24 illuminated whenever the bridge is balanced and the device under test is within the prescribed limits, while if the bridge is balanced and the device under test is outside of the prescribed limits red lamp 25 will be illuminated. Irrespective of the position of the dials of the bridge neither lamp 24 nor lamp 25 will light if the bridge is not balanced.

The above-described circuit functions are provided in accordance with this invention by utilizing a selector means hereinafter referred to as a light relay 26 having an armature 27 and front and back contacts 28 and 29, respectively. When this relay is operated armature 27 closes a circuit to front contact 28 thereby permitting the green lamp signal 24 to light providing, however, the bridge is balanced. When light relay 26 is de-energized by reason of the fact that one or more of the decade dials are adjusted outside of the preselected range, armature 27 is released to close circuit with back contact 29 thereby permitting red lamp 25 to illuminate, providing also that the bridge is balanced. That neither lamp 24 nor lamp 25 will be lighted irrespective of relay 26 will be clear when it is observed that these two lamps must light from current source 30 through the contacts 12, 13 of galvanometer relay 11. Since galvanometer relay 11 will be energized so long as the bridge is unbalanced, neither of the two signal lamps 24 nor 25 can light, whereas when the bridge is substantially balanced the current through galvanometer relay 11 has reduced sufficiently to permit its armature 12 to close the circuit between source 30 and lamps 24 and 25. The manner in which light relay 26 is caused to operate only when the various decade dials are in the proper preselected range will be more fully described later. It will be clearly understood that in accordance with the description thus far the illumination of either of the signal lamps 24 or 25 indicates at once to the operator that the bridge is substantially balanced. Which of the two lamps is illuminated indicates to him whether or not the device under test is within or outside of the prescribed limits. It is therefore unnecessary for him to read all of the dials of the standard arms to arrive at a decision as to whether or not the device is of satisfactory impedance.

While for the preferred embodiment it is desirable to have neither signal lamp 24, 25 light unless the bridge is at balance, it is possible to employ these signals to merely indicate limits and observe the balance by watching the galvanometer 10. In the physical structure lamps 24, 25 are located next to the galvanometer 10 so this practice is not particularly difficult, although it does add one more burden on the operator. This is accomplished by making the connection 54 shown by the dotted line in Fig. 1. The galvanometer relay 11 may obviously be dispensed with when this connection is made.

The manner in which light relay 26 is caused to operate only when the dials are within the prescribed limits may be seen by referring to the circuit shown in decade unit 14. It will be noted that associated with dial 17 are a plurality of dial switches generally denoted by the reference numeral 31. This being a decade dial with eleven positions from 0 to 10, inclusive, there will be eleven dial switches which may be numbered from 0 to 10 as indicated. Each of these dial switches is equivalent to a double pole single throw switch and may be of any mechanical form in so far as the practice of the invention is concerned. In the particular form disclosed schematically in Fig. 1 they are shown in the familiar form of spring type keys commonly used in telephone practice. The associated numerals 0 to 10, inclusive, should not be regarded as reference numerals but as numerals corresponding with those denoting the position of the pointer. It should be understood that the position of the pointer of dial 17 will indicate which one of these dial switches 31 will be operated. The operation of these switches is controlled by the dial 17 through a suitable mechanical linkage schematically indicated as 20 in Fig. 1. Only one of these dial switches 31 will be operated at any one time and, as previously stated, the one which will be operated will depend upon the position of the pointer of dial 17. All of the other decade units, for example, decade 16 also have a similar set of dial switches 31.

Associated with each set of dial switches 31 are two groups of limit or preselector keys 32 and 33. These keys are the equivalent of single pole, single throw manually operated switches and are used for setting up the predetermined limits within which the unknown impedance Z must conform. These two groups of preselector keys 32, 33 may be within the same general enclosure as their associated decade unit 14. For high frequency standards suitable shielding considerations must, of course, be given. Such a shield is schematically indicated by reference numeral 35 which actually surrounds the standard elements as well known. This effectively forms a separate compartment for the preselector keys within the general enclosure 14, which separate compartment may be designated by reference numeral 14'. For existing apparatus, however, this invention may be practiced by building a separate enclosure 14' outside of the existing enclosure 14. In either case the preselector keys are electrically connected to the dial switches 31 through the several pairs of conductors 36 and 37 interconnecting the dial switches with their associated limit selector keys just as shown for Fig. 1.

It will be observed that there are two selector keys for each of the dial switches one coming from the upper group 32 and one from the lower group 33. It will also be observed that the upper limit key 32 is connected in series with the upper pair of contacts of its associated dial switch, which series connection interconnects the upper limit bus bar 38 and its associated upper limit bus bar 38' of the dial switches. Similar circuits may be found between the lower limit keys 33 and the lower pair of contacts of the dial switches which interconnect the lower limit bus bars 39 and 39'. It will be clear that if all of the upper and lower limit selector keys 32 and 33 are left open there will be no series circuit complete between the conductors 40 and 41 irrespective of the position taken by the decade dial. However, if any of the preselector keys should be operated, for example, if the upper limit key 32 for dial position 1 and the lower limit key 33 for dial position 10 are closed as shown in Fig. 1, a circuit may be completed between conductors 40 and 41 providing the decade dial is either on position 1 or on position 10. This completed circuit will be obvious when it is understood that all of the upper limit bus bars 38' in all of the decade preselector units 14, 16 are connected in series. This is also true of the lower limit bus bars 39'. These circuits may be easily traced through the preselector key and dial switch circuits of Fig. 1 when it is remembered that the circuits in each of the decade units are identical.

Referring now to Fig. 2, it will be seen more clearly just how three decade units of one impedance component may be connected together. In Fig. 2 the disclosure relates to only one of the impedance components of the standard arms which are connected to the A and D bridge corners through conductors 21 and 22 just as shown in Fig. 1. The various decades are interconnected by means of conductors 23. If other impedance or admittance components are employed they are connected together in series or in parallel as the circuits require. The connections of these standard decade elements of more than one component are not shown as they are conventional and well known in the art. In Fig. 2 only three impedance decades are shown, 14, 15 and 16, respectively. These may correspond to the hundreds, tens and units decades and are each adjusted by their respective dials 17, 18 and 19. Associated with each of these dials is a set of eleven dial switches which are shown schematically in Fig. 1. The preselector limit keys are within their respective enclosures 14', 15' and 16' associated with their decade units 14, 15 and 16, respectively. The circuits between the upper limit bus bar 38 of each of these selector key units and its associated upper limit bus bar 38' are, of course, through the upper limit key 32 and its series-connected upper pair of contacts of the dial switch as clearly shown in Fig. 1. The preselector key units 14', 15' and 16' are connected together by means of a pair of conductors 42, 43, conductor 42 interconnecting the upper limit bus bar 38' with its corresponding upper limit bus bar 38 of the next preselector decade unit, while conductor 43 interconnects the corresponding lower limit bus bar 39' of one decade unit with its associated lower limit bus bar 39 of the next decade unit.

If other impedance or admittance components are used in the standard arm of the bridge, they may be paralleled with the circuit which is controlled by contacts 12 and 13 of galvanometer relay 11, the connections being made to terminals 13' and 27' as shown on Figs. 1 and 2. The individual circuits for the other components are not shown but are identical with the circuits shown for the one component in Figs. 1 and 2. They would also have their own individual indicator lamps corresponding with lamps 24 and 25. It is obvious that if lamps 24 and 25 are desired to serve for all of the bridge components it is only necessary to connect the conductors of the other preselector circuit components corresponding with conductors 40 and 41 of Fig. 2 in series with one of the conductors 40 or 41. These additional circuits are also not shown as they too are substantial duplicates of the circuits disclosed.

In order to aid in a better understanding of the circuits formed by the upper and lower limit selector keys and their associated dial switches reference may be made to the developed partial schematic Fig. 3. Referring again for a moment to Fig. 1, it will be noted that the dial switches 31 are indicated schematically as being actuated by mechanical linkages 20. Each of the dial switches 31 is coupled through mechanical linkage 20 to its dial 17 by way of its upper blade which is schematically illustrated as containing as a part thereof a cam roller. Referring again to Fig. 3 it will be noted that the upper poles of dial switches 31 are shown in the upper right portion of the figure where the upper blade of the dial switch is shown with its cam roller 44. In this developed partial schematic it will be clearly seen how each of the selector keys is connected in series with its associated dial switch contacts between its bus bars. The circuit relationship of these bus bars with their associated terminals 45, 46, 47 and 48 will also be clearly seen by comparing Fig. 3 with Fig. 1.

The manner in which the above-described circuits may be utilized for setting up various limits within which an impedance or admittance device under test should conform will now be described. Assume for the sake of simplicity that the decade units are for resistance and that a particular device under test is to have a resistance within the limits of 7 to 8 ohms. To accomplish this both the upper and lower limit keys in key units 14' and 15', which correspond with the zero dial positions of the hundreds and tens decades, must be operated. Thus a circuit will be completed through these preselector keys only when their associated dials are on zero. In the units preselector key unit the lower limit preselector key corresponding with dial position 7 must be operated. Also, the upper limit preselector key for dial position 8 must be operated. Thus a circuit will be completed between the upper limit and lower limit bus bars only when the units dial is found on either position 7 or position 8 corresponding with 7 or 8 ohms. If the bridge is also balanced for these dial positions, galvanometer relay 11 will close contacts 12, 13 to cause green light 24 to light indicating the resistance under test is within limits. Should any of the decade dials, for example, the hundreds dial, be on a position other than zero, or the tens dial on a position other than zero, or the units dial on a position other than 7 or 8, no circuit will be completed between conductors 40 and 41 and, consequently, relay 26 cannot operate. If under such conditions the bridge happens to be balanced so that the decade dials actually read the real resistance presented by the device under test galvanometer relay 11 will be released, thus causing the red indicator lamp 25 to light. This indicates that the device under test is outside of limits.

To further illustrate the use of the preselector keys another example of a somewhat more complicated nature will be taken. Assume that the resistance under test is to fall within the range of 94 to 104 ohms. The lower prescribed limit is 94 ohms and this is set up on the preselector keys by operating the lower limit preselector key corresponding with the zero position of the hundreds dial, operating the lower limit preselector key of the tens decade corresponding with the position 9 of the tens decade and since any resistance between 94 and 100 ohms is within the limit range the lower limit preselector keys of the units decade from 4 to 10, inclusive, are all operated. Thus, when the tens decade dial is on position 9 corresponding with 90 ohms and the units dial is on any of the positions from 4 to 10, inclusive, a circuit will be completed through all of the preselector key and dial switch circuits between conductors 40 and 41. The upper limit extends beyond 100 ohms to 104 ohms so the upper limit is set up by operating the upper limit preselector key of the hundreds decade corresponding with dial position 1, the upper limit preselector key of the tens decade corresponding with position 0 and all of the upper limit preselector keys of the units decade corresponding with positions 0 to 4, inclusive. Thus it will be seen that should the hundreds dial be on position 1 corresponding with 100 ohms, the tens dial on position 0 also corresponding with 100 ohms and the units dial anywhere between position 0 to 4 corresponding with 100 to 104 ohms, the circuit between conductors 40 and 41 may be completed between the lower limit preselector keys and their associated dial switch contacts by way of bus bars 39, 39' and interconnecting conductors 43.

With the two examples given above it will easily be seen that the principle to be followed in setting up the limit is that the lower limit should be set up on the lower limit preselector keys in the same order as if the numbers were to be written down. Also the upper limit preselector keys are to be operated in a similar manner. Then all the intervening keys should be operated between the limits set up. Typical examples for six different limit ranges including the two above described may be found in Table I below:

Table I

| For limit range | Close switch Nos. | | | | | |
|---|---|---|---|---|---|---|
| | Hundreds | | Tens | | Units | |
| | Lower limit | Upper limit | Lower limit | Upper limit | Lower limit | Upper limit |
| 7-8 | 0 | 0 | 0 | 0 | 7 | 8 |
| 6-8 | 0 | 0 | 0 | 0 | 6-7 | 8 |
| 9-11 | 0 | 0 | 0 | 1 | 9-10 | 0-1 |
| 37-43 | 0 | 0 | 3 | 4 | 7-10 | 0-3 |
| 94-104 | 0 | 1 | 9 | 0 | 4-10 | 0-4 |
| 100-103 | 1 | 1 | 0 | 0 | 0-2 | 3 |
| 987-1,000 | 9 | 9 | 8-9 | 9 | 7-10 | 0-6 |

Fig. 4 illustrates a plan view of one of the mechanical structures which may be employed in practicing this invention. The particular mechanical structure which may be employed is unimportant and a great variety of well-known equivalent mechanical structures may be employed. In Fig. 4 the mechanical linkage, schematically illustrated by reference numeral 20 in Fig. 1, is shown in the form of a cam 20 with only one hollow 21'. Instead of having a hollow 21' in the cam it is obvious that this may be a cam rise by merely reversing the operation of the switch structures 31. Only four of the dial switch structures 31 are shown. There must, however, be one of these dial switches for each position which is to be taken by the dial. In the usual decade structure the dial takes eleven positions and, consequently, eleven dial switches 31 must be provided. As previously stated, only one of these dial switches will operate at any one time and the switch which operates will correspond with the position indicated by the dial pointer. The cam roller 44 of each of the dial switches is shown engaging the face of the cam 20 and all of the dial switches are shown in their unoperated positions except for the one corresponding with the hollow 21' of the cam 20. In this case the cam roller 44 has lowered into the hollow 21' thereby operating the switch in a well-known manner. The cam 20 may be mounted on a shaft 49 associated with the dial knob 50, shown in Fig. 5. The remaining reference numerals of the circuit elements correspond with those shown on the schematic drawing Fig. 1 and therefore require no further description.

Figure 5:
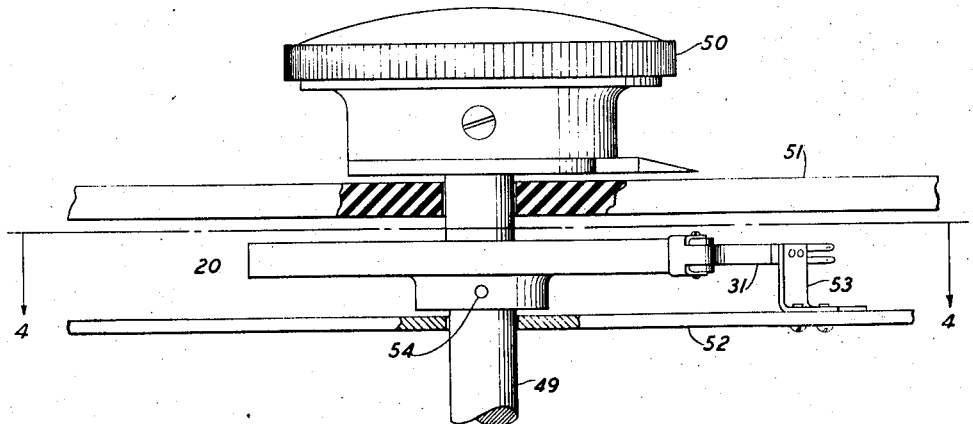
Fig. 5 is an elevation view of the dial and switches disclosed in Fig. 4.

Referring to Fig. 5 which shows an elevation of the structure of Fig. 4, the mechanical structure of Fig. 4 may be more easily seen. It will thus be noted that Fig. 4 is the section taken on the line 4—4 of Fig. 5 and that to avoid confusion the panel 52 used for mounting the various dial switch supports 53 has been deleted. Also in Fig. 5 the wiring shown schematically in Fig. 4 has been deleted. In Fig. 5 it will be seen that the cam 20 is keyed to shaft 49 by means of a taper pin 54. The knob 50 with its pointer is mounted to the upper end of shaft 49 in a conventional manner. The top panel 51 is the usual insulated panel of the decade unit. The lower panel 52 is preferably made of a metallic material and may form a part of the shield. This also forms the support for the switch members 31.

Figs. 6 and 7 show alternative signal circuits which may be used with either Fig. 1 or 2. For example, Fig. 6 differs from Fig. 2 by connecting the current source 30 directly in series with the coil of relay 26 rather than through the contacts of galvanometer relay 11. Thus the light relay 26 will operate through the preselector keys and dial switch circuits irrespective of whether or not the bridge is balanced to release the galvanometer relay 11. It will be remembered that in connection with Fig. 2 light relay 26 cannot operate unless the galvanometer relay 11 has released thereby indicating a balance of the bridge. In Fig. 6, although this light relay 26 may operate, neither of the signal lights 24 nor 25 will be illuminated unless the galvanometer relay 11 has released thereby indicating bridge balance. Consequently, the operation of the circuit of Fig. 6 in so far as the use of the signal lights 24 and 25 are concerned is identical with that previously described for Figs. 1 and 2.

The signal circuit of Fig. 7 differs from the circuit of Fig. 2 only in that the green signal light 24 is connected directly to one side of current source 30 rather than through the contacts of galvanometer relay 11. Here again the operation in so far as the signal lights are concerned is the same as for Figs. 1, 2 and 6 already described. It will be noted in Fig. 7 that the green signal light 24 will not light unless relay 26 has operated and since light relay 26 cannot operate unless the bridge has been balanced, thereby releasing galvanometer relay 11, neither the green light 24 nor the red light 25 will be illuminated unless the bridge is balanced.

While in the description of this invention the signal means has been illustrated as being in the form of a visual indicator such as a lamp, it is obvious that it need not be so. It is obvious that it may take the form of any kind of electromechanical visual indicator or audible signal. It is also obvious that in accordance with well-established manufacturing practice these signaling devices may be associated with a material handling switch which will cause the electrical device under test to be ejected from the testing device and distributed into an accept or reject bin accordingly as to whether it passes or fails to pass the preselected limit requirements. Thus the signaling devices 24 and 25 may include as part thereof the coils of such a material handling means for segregating the acceptable from the unacceptable product.

What is claimed is:

1. A limit signal for an electric measuring bridge standard of the type having a plurality of multiposition dials for adjusting and indicating the value of the standard, said limit signal comprising a cam for each dial rotatable to positions corresponding to those of its dial, a plurality of double pole single throw dial switches for each cam, one of said switches for each dial position, each of the cams being adapted to close but one of its associated dial switches at a time, a separate preselector key for each pole of each of said double pole dial switches, each of said preselector keys being connected in series with the pole of its corresponding double pole switch, two pairs of bus bars for each dial, the first of said pairs having connected in parallel therebetween one of the poles of each of said dial switches and their series-connected preselector key, the second of said pairs having connected in parallel therebetween the remaining pole of each of said dial switches and their series-connected preselector keys, one series circuit comprising the bus bars of like kind for all of the dials, a second series circuit comprising the remaining bus bars for all of the dials, a parallel circuit formed by said two last-named series circuits, an electroresponsive switching means connected in series with said last-named parallel circuit, an operated condition and an unoperated condition for said electroresponsive switching means, two signaling devices connected to said switching means, one of the signaling devices being responsive to the switching means in its operated condition and the other signaling device being responsive to the switching means in its unoperated condition whereby said signaling devices may indicate whether or not the dials are within the limits of a preselected range, which range may be determined by the operation of said preselector keys.

2. A limit signal for an electric measuring bridge standard of the type having a plurality of multiposition dials for adjusting and indicating the value of the standard, said limit signal comprising a cam for each dial rotatable to positions corresponding to those of its dial, a plurality of double pole, single throw dial switches for each cam, one of said switches for each dial position, each of the cams being adapted to close but one of its associated dial switches at a time, a separate preselector key for each pole of each of said double pole dial switches, each of said preselector keys being connected in series with the pole of its corresponding double pole switch, a first parallel circuit for each dial comprising one of the poles of each of the dial switches and their series-connected preselector keys, a second parallel circuit for each dial comprising the remaining poles of each of the dial switches and their series-connected preselector keys, a first series circuit comprising said first-named parallel circuits of all of said dials, a second series circuit comprising said second-named parallel circuits of all of said dials, means connecting said first series circuit and said second series circuit in parallel, an electroresponsive switching means connected in series with said last-named parallel circuit, an operated condition and an unoperated condition for said electroresponsive switching means, two signaling devices connected to said switching means, one of the signaling devices being responsive to the switching means in its operated condition and the other signaling device being responsive to the switching means in its unoperated condition whereby said signaling devices may indicate whether or not the dials are within the limits of a preselected range, which range may be determined by the operation of said preselector keys.

3. A limit signal for an electric measuring bridge standard of the type having a plurality of multiposition dials for adjusting and indicating the value of the standard, said limit signal comprising a plurality of double pole, single throw dial switches for each dial, a switch operating mechanism responsive to the position of said dial for individually operating said switches in a predetermined sequence, a separate preselector key for each pole of each of said double pole dial switches, each of said preselector keys being connected in series with the pole of its corresponding double pole switch, a first parallel circuit for each dial comprising one of the poles of each of the dial switches and their series-connected preselector keys, a second parallel circuit for each dial comprising the remaining poles of each of the dial switches and their series-connected preselector keys, a first series circuit comprising said first-named parallel circuits of all of said dials, a second series circuit comprising said second-named parallel circuits of all of said dials, means connecting said first series circuit and said second series circuit in parallel, an electroresponsive switching means connected in series with said last-named parallel circuit, an operated condition and an unoperated condition for said electroresponsive switching means, two signaling devices connected to said switching means, one of the signaling devices being responsive to the switching means in its operated condition and the other signaling device being responsive to the switching means in its unoperated condition whereby said signaling devices may indicate whether or not the dials are within the limits of a preselected range, which range may be determined by the operation of said preselector key.

4. A limit signal for an electric measuring bridge standard of the type having a plurality of multiposition dials for adjusting and indicating the value of the standard, said limit signal comprising a plurality of double pole, single throw dial switches for each dial, a switch operating mechanism responsive to the position of said dial for individually operating said switches in a predetermined sequence, a separate preselector key for each pole of each of said double pole dial switches, each of said preselector keys being connected in series with the pole of its corresponding double pole switch, two pairs of bus bars for each dial, the first of said pairs having connected in parallel therebetween one of the poles of each of said dial switches and their series-connected preselector keys, the second of said pairs having connected in parallel therebetween the remaining pole of each of said dial switches and their series-connected preselector keys, one series circuit comprising the bus bars of like kind for all of the dials, a second series circuit comprising the remaining bus bars for all of the dials, a parallel circuit formed by said two last-named series circuits, an electroresponsive switching means connected in series with said last-named parallel circuit, an operated condition and an unoperated condition for said electroresponsive switching means, two signaling devices connected to said switching means, one of the signaling devices being responsive to the switching means in its operated condition and the other signaling device being responsive to the switching means in its unoperated condition whereby said signaling devices may indicate whether or not the dials are within the limits of a preselected range, which range may be determined by the operation of said preselected key.

5. The combination in accordance with claim 1 and an electric bridge including said standard, an output circuit for said bridge, a galvanometer relay means in said output circuit having normally closed contacts adjusted to open at a predetermined unbalanced voltage in said output circuit, and circuit means coupling said contacts with said signaling devices whereby said signaling devices may be rendered inoperative upon the opening of said galvanometer relay contacts.

6. The combination in accordance with claim 2 and an electric bridge including said standard, an output circuit for said bridge, a galvanometer relay means in said output circuit having normally closed contacts adjusted to open at a predetermined unbalanced voltage in said output circuit, and circuit means coupling said contacts with said signaling devices whereby said signaling devices may be rendered inoperative upon the opening of said galvanometer relay contacts.

7. The combination in accordance with claim 3 and an electric bridge including said standard, an output circuit for said bridge, a galvanometer relay means in said output circuit having normally closed contacts adjusted to open at a predetermined unbalanced voltage in said output circuit, and circuit means coupling said contacts with said signaling devices whereby said signaling devices may be rendered inoperative upon the opening of said galvanometer relay contacts.

8. The combination in accordance with claim 4 and an electric bridge including said standard, an output circuit for said bridge, a galvanometer relay means in said output circuit having normally closed contacts adjusted to open at a predetermined unbalanced voltage in said output circuit, and circuit means coupling said contacts with said signaling devices whereby said signaling devices may be rendered inoperative upon the opening of said galvanometer relay contacts.

9. A bridge balance and limit signal for an electric bridge which includes an adjustable standard of the type having a plurality of multi-position dials for adjusting and indicating the value of the standard, said balance and limit signal comprising a first circuit including a switching means mechanically linked with said dials and responsive to predetermined positions thereof, a relay responsive to the balance condition of the bridge, a pair of signaling devices, a second circuit for connecting said signaling devices to said relay whereby they may be energized upon the response of the relay to the balance of the bridge, and a selector circuit connecting said first circuit and switching means to the signaling devices whereby when the bridge is balanced the signaling devices are alternately energized according to whether or not the standard dials are all positioned inside or any one of them is positioned outside of their predetermined limits.

10. A bridge balance and limit signal for an electric bridge which includes an adjustable standard of the type having a plurality of multi-position dials for adjusting and indicating the value of the standard, said balance and limit signal comprising a switching circuit including a switching means mechanically linked with said dials and responsive to predetermined positions thereof, an indicating device responsive to the balance condition of the bridge, a pair of signaling devices, and a selector circuit connecting said swicthing circuit and switching means to the signaling devices whereby the signaling devices are alternately energized according to whether or not the standard dials are all positioned inside or any one of them is positioned outside of their predetermined limits.

11. The combination according to claim 9 wherein the selector circuit includes a relay having a coil and front and back contacts, said coil being connected to said first circuit, said front contact to one of the signaling devices and said back contact to the other signaling device.

12. The combination according to claim 10 wherein the selector circuit includes a relay having a coil and front and back contacts, said coil being connected to said switching circuit, said front contacts to one of the signaling devices and said back contacts to the other signaling device.

JOHN E. NIELSEN.